(12) United States Patent
Sundareson et al.

(10) Patent No.: US 8,213,741 B2
(45) Date of Patent: Jul. 3, 2012

(54) METHOD TO GENERATE THUMBNAILS FOR DIGITAL IMAGES

(75) Inventors: Prabindh Sundareson, Thiruparankundram (IN); Shanmuga Sundaram Mahendran, Kumbakonam (IN)

(73) Assignee: Texas Instruments Incorporated, Dallas, TX (US)

( * ) Notice: Subject to any disclaimer, the term of this patent is extended or adjusted under 35 U.S.C. 154(b) by 865 days.

(21) Appl. No.: 12/339,640

(22) Filed: Dec. 19, 2008

(65) Prior Publication Data

US 2010/0158409 A1 Jun. 24, 2010

(51) Int. Cl.
*G06K 9/20* (2006.01)

(52) U.S. Cl. .................. 382/282; 348/333.05; 715/838

(58) Field of Classification Search ............. 348/333.05; 382/199, 282; 386/241; 715/838
See application file for complete search history.

(56) References Cited

U.S. PATENT DOCUMENTS

| 2007/0101268 A1* | 5/2007 | Hua et al. ...................... 715/721 |
| 2009/0077497 A1* | 3/2009 | Cho et al. ...................... 715/814 |
| 2009/0232401 A1* | 9/2009 | Yamashita et al. ............ 382/199 |

* cited by examiner

*Primary Examiner* — Gregory F Cunningham
(74) *Attorney, Agent, or Firm* — Robert D. Marshall, Jr.; Wade James Brady, III; Frederick J. Telecky, Jr.

(57) ABSTRACT

This invention generates object-focused thumbnails from input images reflecting the mood and intention of the user, based on the original high-resolution picture. The invention includes edge detection, clustering detected edges into regions, ranking the regions and forming the thumbnail from a portion of the input image having a predetermined thumbnail size centered at a center of the highest ranking region. With this invention, the thumbnail accurately captures the focus of the image.

15 Claims, 5 Drawing Sheets

METHOD TO GENERATE THUMBNAILS FOR DIGITAL IMAGES

TECHNICAL FIELD OF THE INVENTION

The technical field of this invention is storage and display of digital images, particularly where small/miniature displays are involved.

BACKGROUND OF THE INVENTION

Digital cameras, movie recorders and personal computers with camcorder attachment create, store and display digital images. These devices often need to generate thumbnails. Thumbnails are objects that are a portion of the image. Generation of thumbnails shows the user all image components in a single screen for searching or previewing the images. The prior art reduces the resolution of the original image to a level suited to the thumbnail size. Many image-resizing technologies exist to generate a lower resolution image. The main disadvantage of this prior art image resizing is that the resolution of the device screen is the deciding factor in giving the best image clarity. Showing a reduced resolution image will always be worse than showing a high resolution window of the original image.

When compared to an original high-resolution image, a resized image using commercially available image management tools is recognizable only from its overall appearance and shades, but specifics are lost. Digital still cameras create, store and process digital pictures. The size of the target monitor or viewing device is one of the important parameters for getting satisfactory displays when a digital picture is viewed. For example, a picture taken with the highest resolution in a 5 Mega Pixel camera, which includes many objects, may not display well in a 1.5 inch LCD display, if displayed in full size. When viewing and searching a large collection of images, it is difficult to quickly find a required image if there are too many objects in each image. Hence there is a need to create smaller sized equivalents (called thumbnails) of a high resolution picture, for storage and quick search. These thumbnails may also be used to reduce the search target area for content retrieval algorithms like MPEG-7. Several prior art methods generates thumbnails. Most of these methods rely on color information and face-detection.

SUMMARY OF THE INVENTION

This invention generates object-focused thumbnails reflecting the mood and intention of the user based on the original high-resolution picture. Using this method, a thumbnail that accurately captures the focus of the image can be generated and stored. The method uses existing EXIF standards for storage of the generated thumbnail along with the original image. This invention uses: (1) edge-detection as a pre-processing step before region identification in order to simplify the region identification; and (2) varies where the weight for some parameters in each region based on the value of the parameter itself. This identifies a window of the original image to generate a more meaningful thumbnail.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
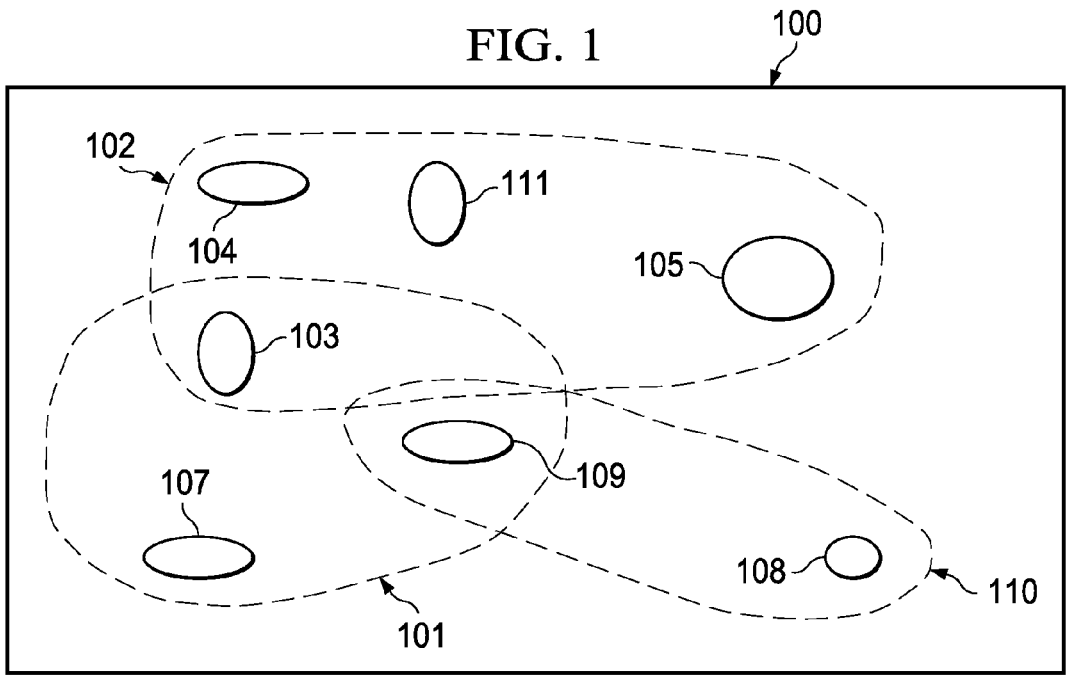
FIG. 1 illustrates a sample set of objects and regions identified in the thumbnail generation of this invention.

In the present invention, the image is first analyzed manually and subjectively by the user to identify the objects distinguished from the background. FIG. 1 illustrates the elements of an example image reduced to objects and regions. The full image is contained in 100. Three regions 101, 102 and 110 are defined. Each region contains one or more objects and these objects may be shared by one or more regions. For example, region 101 contains objects 103, 107 and 109, sharing object 109 with region 110 and sharing object 103 with region 102. Similarly, region 102 contains four objects 103, 104, 105 and 111 sharing only object 103 with region 101. Region 110 has two objects 108 and 109 sharing object 109 with region 101.

The first step in generating useful thumbnails is a meaningful object identification process. After the objects are selected by marking areas of the image as shown in FIG. 1, these objects are rated according to their overall usefulness using defined parameters. A number of parameters for each object are identified. Each parameter associated with objects is assigned a score or rank. The parameters are defined as follows:

Lighting (Object lighting or background lighting);
Focus (Focus on the object);
Distance (Distance of the object from the shooting position);
Location (Location of the object in the image); and
Similar Objects (Number of similar images identified by size or number of images at similar focus and lighting).

Each parameter has a statically assigned rank based on the previous subjective experience of the designer. Each parameter is also assigned a dynamic rank. The static rank is predefined and does not change during analysis. The dynamic rank may change during analysis.

A domain is a grouping of one or more related parameters. A parameter can fall into one or more domains with differing overlap levels. For instance, the Focus on the object and the Location of the object in the image parameters can overlap each other across domains. The parameters are clubbed or partially ordered into sets of overlapping nonexclusive domains depending on their correlation. Each domain gets a relative ranking based on the pattern of distribution of score over the domains. Then the parameter gets a portion of the rank depending upon the participation of a parameter in a domain. This is the dynamic rank of the parameter. The relative importance of the parameters is the sum of its static rank and relative dynamic ranks from the domains in which it participates. This splitting of multiplication factors is required because a predefined coefficient will not give good results when images contradicting predefined rules are encountered.

As an example, areas that receive the highest lighting can generally be considered the center-of-attention. But there may be an image where even though an area receives lighting that area is not focused. In that case, the weighting for focus is increased so that the focused area gets the center-of-attention rather than the most lighted area.

Rank of Importance R is defined by:

$$R = (a \times SR) + (b \times DR) \quad [1]$$

where: SR is the static rank; DR is the dynamic rank; and a and b are empirical parameters.

Figure 2:
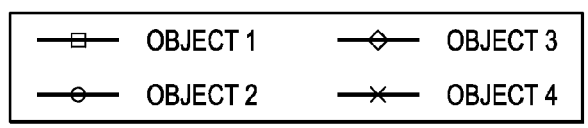
FIG. 2 illustrates a sample parameter object graph giving an assigned rank to the parameters.
Figure 2:
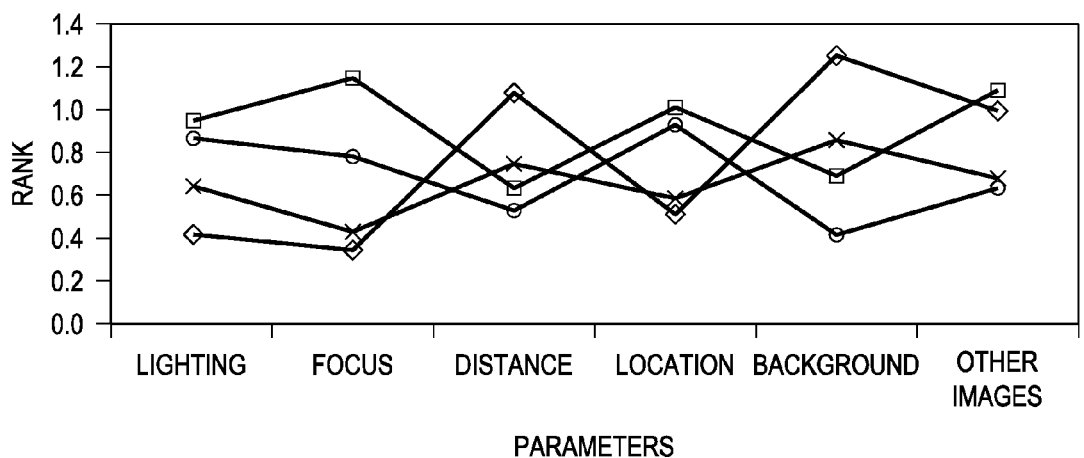

FIG. 2 illustrates a sample parameter/object graph for four objects. Four objects (Object 1, Object 2, Object 3 and Object 4) are ranked on the parameters Lighting, Focus, Distance, Location, Background and Other Images.

The second step in thumbnail development is region identification. Based on the spatial distribution of objects, the image is classified as a set of overlapping nonexclusive regions. The score assigned to the objects are based on the parameters ordered by their relative importance, which also influences a region boundary. While defining the regions these parameters are considered useful:

Spatial distribution of objects;
Score the objects within the region get on the parameters;
Ratio of the actual size of the image to the size of the region to the size of the thumbnail;
Number of objects in the region; and
Number of objects of similar score distribution in the region.

Thus, if two objects with high scores for important parameters are close enough then they both are clubbed into a region. The ratio of the size of the image to the size of the region to the size of the thumbnail determines whether the objects are close enough to be clubbed.

A weight is calculated for each region keying off the scores the objects in that region attain and the relative importance of those parameters. Spatial distribution of the image is analyzed and a region is selected as the most prominent region of the image. This analysis considers the special cases: a single object occupying most of the image; an image with no distinguishable foreground objects; and an image with very few objects. In some cases, it may happen that a region including all the objects in the image has significantly higher weight over other smaller regions. In that case the entire image or most of image enclosing all the objects is selected as the most prominent region. Once the most prominent region is identified, a thumbnail is generated based on this selected region.

Figure 3:
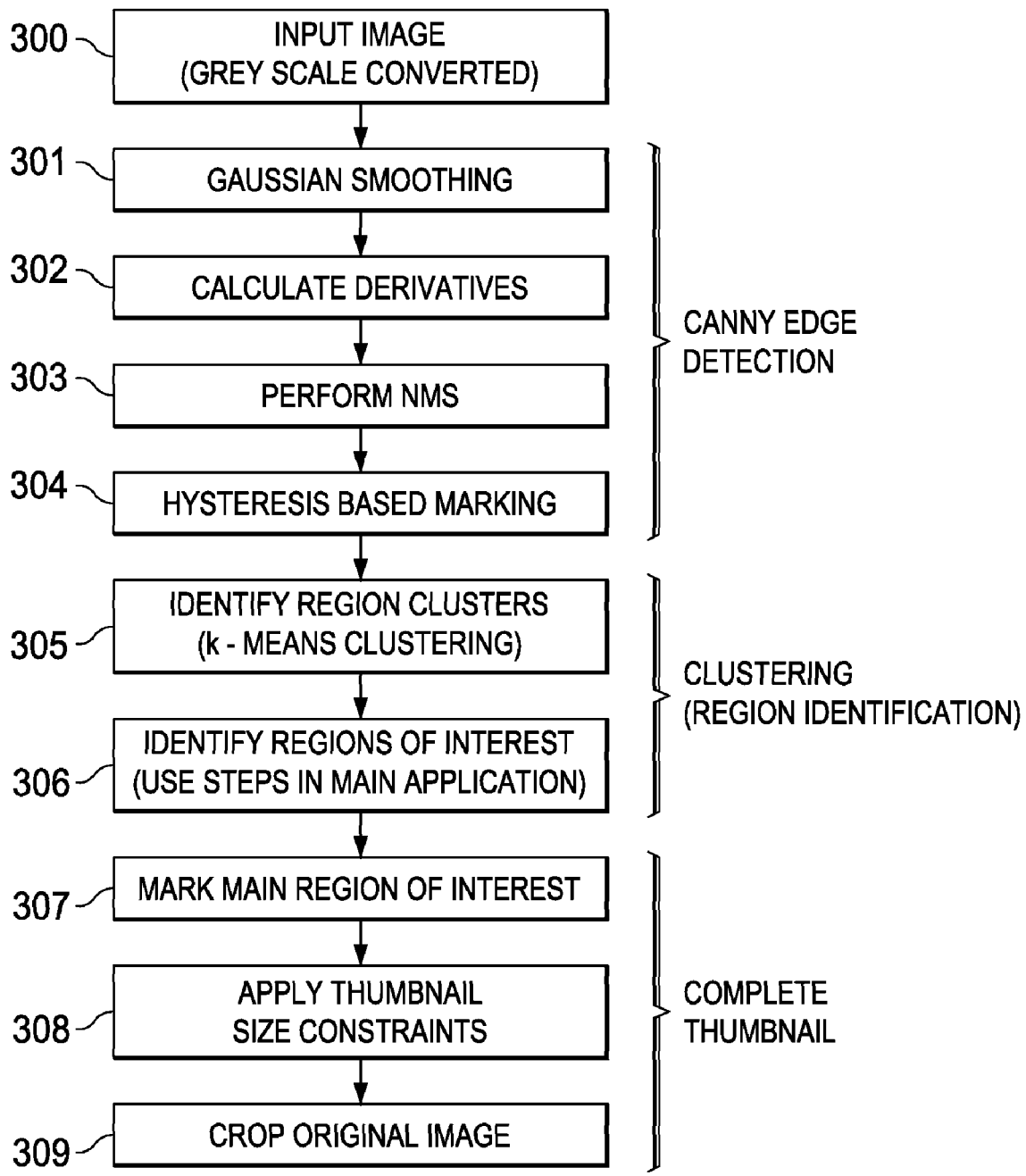
FIG. 3 illustrates a flow chart for thumbnail generation according to this invention.

FIG. 3 illustrates a detailed flow diagram of the thumbnail generation of this invention. FIG. 3 includes three major sections: Canny edge detection in blocks 301 to 304; clustering in blocks 305 and 306; and completing the thumbnail in blocks 307 to 309.

Step 300 receives the input image for which a thumbnail is desired. The present invention preferably uses a JPEG compressed file to create thumbnails of a pre-determined target size. The JPEG compressed file is parsed to extract its contents, which are then decoded to obtain the raw color information of the picture. This information may be in RGB, YUV, or TGA formats. Because the Canny edge detection implementation used in the following process requires a TGA image, the JPEG file contents are first converted to TGA format.

Steps 301 through 304 comprise Canny edge detection. Edges demarcate object boundaries and are therefore of fundamental importance in image processing. Edges in images are areas with strong intensity contrasts such as a jump in intensity from one pixel to the next. Edge detection reduces the image to a series of edges. This significantly reduces the amount of data and filters out useless information, while preserving the important structural properties. These edges can be more easily grouped together than the full image. This edge detection is a pre-processing measure to reduce the complexity of the region identification.

Canny edge detection enhances the process in three ways. The Canny edge detection reduces the error rate. Edges occurring in images are not missed and there are no responses to non-edges. The Canny edge detection localizes edge points, thus finding the distance between the edge pixels and reducing to a minimum the actual edge. The Canny edge detection produces only one response to a single edge.

In step 301 the Canny edge detection smoothes the image via a Gaussian filter. This eliminates noise. Because a Gaussian filter can be computed using a simple mask, it is used exclusively in Canny edge detection. Once a suitable mask has been calculated, the Canny edge detection performs Gaussian smoothing using standard convolution methods. The convolution mask is usually much smaller than the image. The mask is slid over the image, manipulating a square of pixels at a time. The larger the width of the Gaussian mask, the lower is the detector sensitivity to noise.

In step 302 the Canny edge detection calculates image derivatives to find the image gradient. This highlights regions with large spatial changes and sharpens the image edges.

Step 303 traces the edges using the non-maximal suppression technique (NMS). This tracks along these regions and suppresses any pixel that is not at the maximum suppression.

Step 304 marks the various significant areas in the image. The gradient array is reduced by hysteresis, tracking along the remaining pixels that have not been suppressed. This hysteresis-based marking completes the edge detection.

Once edges are determined, steps 305 and 306 provide clustering for region identification. Step 305 identifies all closely grouped edges together in a region from the edge-detected image, using the widely used K-means clustering.

K-means clustering classifies a given data set through a certain number of clusters k, each identified by a centroid and placed experimentally to optimize results. The next step is to take each point belonging to a given data set and associate it to the nearest centroid. The k new centroids then form the basis of a new binding between data set points and the nearest new centroid. This process loops changing the location of k centroids step by step until no more changes are done. K-means clustering includes the steps of:

1. Placing k points in the space represented by the objects that are being clustered. These points represent initial group centroids;
2. Assigning each object to the group that has the closest centroid; and
3. When all objects have been assigned, recalculating the positions of the k centroids.

Steps 2 and 3 repeat until the centroids no longer move. This produces a separation of the objects into groups from which the metric to be minimized can be calculated.

Step 306 identifies regions of interest by their centroids and a number of points around that centroid. The centroid of a region is the Modulus of sum of distance between all the points and the Number of points. The size (coordinates) of this region of interest are calculated and applied on the main image.

Step 307 determines which of these identified regions are the most appropriate regions to be used for thumbnails. For step 307 the following parameters are identified for each region:

1. Brightness (B)—Brightness in this case is calculated as:

$$B = \frac{P_{total} - P_{grey}}{P_{total}} \quad [2]$$

where: $P_{total}$ is the total number of pixels in the region; and $P_{grey}$ is the number of grey level pixels in the region. Grey level pixels are pixels whose luminance (intensity) is less than 40% of a maximum luminance. The parameter B is calculated from the original image pixels.

2. Edge Sharpness (S)—Edge Sharpness indicates the focus on the region. This is determined by number of edges in a region. This parameter is calculated from the edge-detected image, which is the number of edges in region divided by total number of edges in image.

3. Location of the region (L)—Location is determined by the distance of the centroid of the region from the center of the image in (x,y) coordinates. This parameter L is calculated from the edge-detected image. L is defined as a percentage in the form:

$$L = 1 - (\text{Centroid Distance}) \quad [3]$$

where: Centroid Distance is the distance in pixels from the centroid to the center of image divided by the width of image in pixels. This definition ignores any vertical offset of the region from center. Note that these parameters can be calculated only after the regions are identified.

Figure 4:
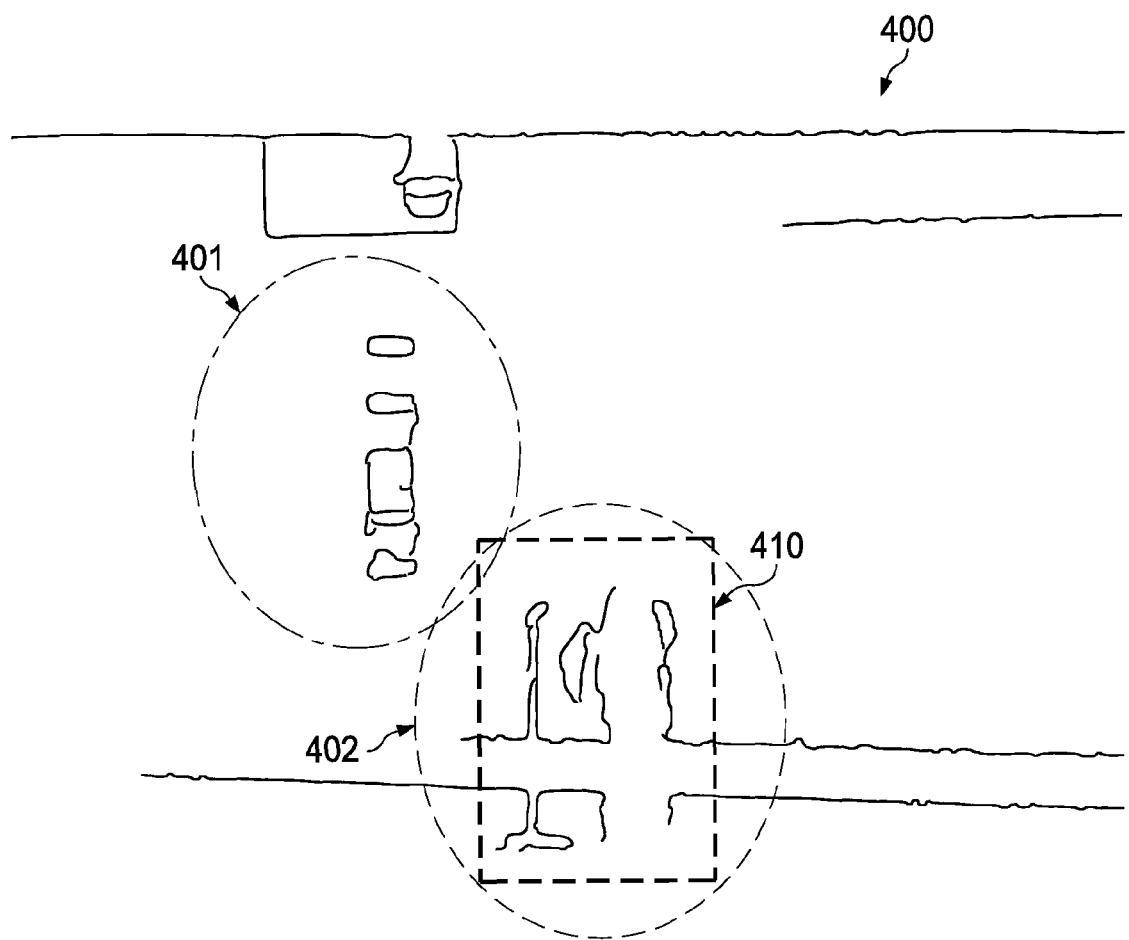
FIG. 4 illustrates a sample object finalized for thumbnail storage.

4. After identifying the above parameters for each region, a final score is calculated using static and dynamic weights. This splitting of weights into static and dynamic is required because a predefined weight will not give good results for images contradicting predefined rules. Foe example this is encountered for an image having a bright region that is not focused. In this case, the weighting for brightness is decreased so that the overall score for this region is less than that of the focused region. The Final Score is:

$$\text{Final Score} = B*wB + S*wS + L*wL \quad [4]$$

where: wB, wS and wL are the respective combined static and dynamic weights assigned to respective brightness, sharpness and location. The final score given by equation [4] is calculated for all identified regions identified. The region with the highest score among all regions is selected as the thumbnail region. Step 308 generates the thumbnail as an X by Y pixel area centered on the region. The example image 400 of FIG. 4 includes identified regions 401 and 402. In this example region 402 is chosen. Step 307 identifies a rectangular section 410 around region 402 as a thumbnail candidate. This thumbnail candidate 410 is stored. In some cases where clear regions cannot be identified in the image, such as when no region receives more than a predetermined final score, the algorithm returns to a normal thumbnail mode. In this normal mode the entire image is resized to suit the required thumbnail size. Step 308 calculates the thumbnail area as:

$$X_{TL} = (X - x)$$

$$Y_{TL} = (Y - y)$$

$$X_{BR} = (X + x)$$

$$Y_{BR} = (Y + y)$$

where: $(X_{TL}, Y_{TL})$ are the top left thumbnail coordinates; $(X_{BR}, Y_{BR})$ are the bottom right thumbnail coordinates; X is the x-coordinate size of the thumbnail; Y is the y-coordinate size of the thumbnail; and (x,y) are the coordinates of the region centroid.

The key contribution of the present invention is using edge detection to identify different regions. A second key is the manner in which the main region of interest is identified by using the static plus dynamic ranking scheme.

It is useful to examine the results obtained in the several examples. These examples illustrate the contrasts between thumbnails created by sub-sampling and thumbnails created by this invention.

Figure 5:
FIG. 5 illustrates a tower image thumbnail generated by prior art sub-sampling alone.

FIG. 5 illustrates a tower image thumbnail generated by subs-sampling alone. Only a small portion of the thumbnail image relates to the twin towers, which is the primary object of interest.

Figure 6:
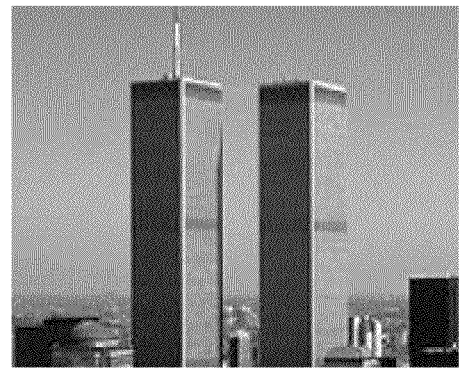
FIG. 6 illustrates an object-focused thumbnail of the tower image generated by this invention.

FIG. 6 illustrates an object-focused thumbnail of the tower image generated by this invention. The towers are prominent in the thumbnail, which is a desirable result.

Figure 7:
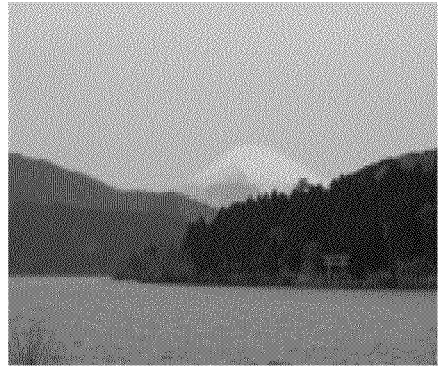
FIG. 7 illustrates a mountain image thumbnail generated by prior art sub-sampling alone.

FIG. 7 illustrates a mountain image thumbnail generated by sub-sampling alone. Only a small portion of the thumbnail image relates to the mountain, which is the main object of interest.

Figure 8:
FIG. 8 illustrates an object-focused thumbnail of the mountain image generated by this invention.

FIG. 8 illustrates an object-focused thumbnail of the mountain image generated by this invention. The mountain stands prominent in the thumbnail, which is a desirable result.

Figure 9:
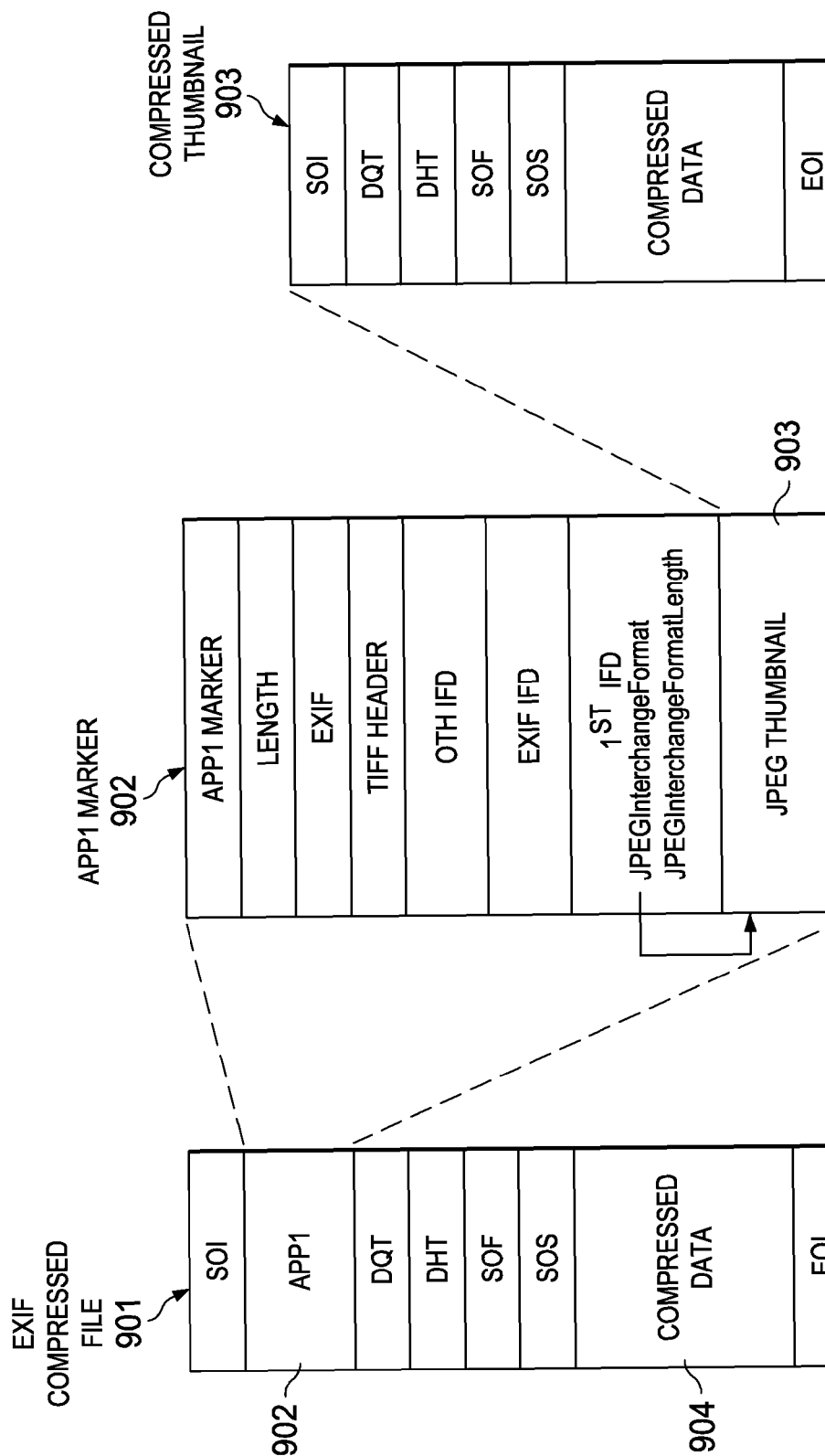
FIG. 9 illustrates the structure of the EXIF file standard for thumbnail storage.

FIG. 9 illustrates the structure of an EXIF file standard preferably used for thumbnail storage. Once generated, the thumbnail can be linked to the primary picture in several forms. The example of FIG. 9 links the location of the thumbnail to the location of the main image JPEG file. The EXIF file format permit storing the thumbnail along with the JPEG compressed file itself in a header before the start of the image. FIG. 9 illustrates three areas. The first area 901 is an EXIF compressed file. FIG. 9 illustrates the layout of the full EXIF file including some fields not relevant to this invention. This file is normally stored an external SD memory card. In this file, the portion called compressed data 904 contains the full sized JPEG image data. An APP1 marker 902 is the expanded area of the APP1 segment from the compressed file in area 901. APP1 marker 902 contains the JPEG thumbnail. Third area 903 is the contents of the compressed thumbnail. Third area 903 includes similar fields as first area 901. This invention targets the generation of the thumbnail and is not concerned with the exposition of the EXIF format.

This invention provides many advantages over the sub-sampled thumbnail of the prior art. This invention helps the user organize and browse through an image collection in a better way than existing solutions. This invention enhances the value of a product using it. This invention makes the subject of the image prominently visible in the thumbnail, reflecting the purpose and situation in which the image is taken. Content-based image retrieval helps a user find all images concerning a certain object. Most of such tools search for the specific content in the archived database of thumbnails. For such applications using this invention will improve the efficiency and performance due to the high-resolution subject of image. This method can be used as a pre-processing technique in such cases.

What is claimed is:
1. A method of generating a thumbnail image from an input image comprising the steps of:
   receiving an input image;
   detecting edges in the input image;
   clustering said detected edges into corresponding regions;

ranking each region on a plurality of parameters concerning prominence of the region within the input image;
identifying a region having a highest rank;
forming the thumbnail as portion of the input image having a predetermined thumbnail size centered at a center of said highest ranking region; and
outputting said thumbnail.

2. The method of generating a thumbnail image of claim 1, wherein:
said step of detecting edges includes Gaussian smoothing the input image.

3. The method of generating a thumbnail image of claim 1, wherein:
said step of detecting edges includes calculating image derivatives of the image gradient.

4. The method of generating a thumbnail image of claim 1, wherein:
said step of detecting edges includes tracing the detected edges using the non-maximal suppression technique (NMS).

5. The method of generating a thumbnail image of claim 4, wherein:
said step of detecting edges includes reducing the gradient array by hysteresis tracking along remaining not suppressed pixels.

6. The method of generating a thumbnail image of claim 1, wherein:
said step of clustering includes K-means clustering.

7. The method of generating a thumbnail image of claim 6, wherein:
said step of K-clustering includes
classifying said detected edges in a plurality of clusters k, each cluster identified by a centroid,
associating each point belonging to a give cluster with the cluster having the nearest centroid,
calculating a new centroid for each cluster,
repeating said associating step and said calculating step until said associating step produces no changes in said clusters.

8. The method of generating a thumbnail image of claim 6, wherein:
said step of clustering includes further includes
identifying regions by their centroids and a number of points around said centroid, and
calculating a size of each region.

9. The method or generating a thumbnail image of claim 1, wherein:
said step of ranking each region includes calculating a brightness B of each region according to $$B = \frac{P_{total} - P_{grey}}{P_{total}}$$

where: $P_{total}$ is the total number of pixels in said region; and $P_{grey}$ is the number of grey level pixels whose luminance is less than 40% of a maximum luminance in said region.

10. The method or generating a thumbnail image of claim 1, wherein:
said step of ranking each region includes calculating an edge sharpness S of said region by dividing a number of edges in said region by a total number of edges the input image.

11. The method or generating a thumbnail image of claim 1, wherein:
said step of ranking each region includes calculating a location of the region L by:

$$L = 1 - (\text{Centroid Distance})$$

where: Centroid Distance is the distance in pixels from the centroid of said region to the center of the input image divided by the width of the input image in pixels.

12. The method or generating a thumbnail image of claim 1, wherein:
said step of ranking each region includes
calculating a brightness B of each region according to $$B = \frac{P_{total} - P_{grey}}{P_{total}}$$

where: $P_{total}$ is the total number of pixels in said region; and $P_{grey}$ is the number of grey level pixels whose luminance is less than 40% of a maximum luminance in said region,
calculating an edge sharpness S of said region by dividing a number of edges in said region by a total number of edges the input image,
calculating a location of the region L according to:

$$L = 1 - (\text{Centroid Distance})$$

where: Centroid Distance is the distance in pixels from the centroid of said region to the center of the input image divided by the width of the input image in pixels, and
calculating a final score according to $$\text{Final Score} = B*wB + S*wS + L*wL$$

where: wB, wS and wL are the respective combined weights assigned to respective brightness, sharpness and location.

13. The method of generating a thumbnail image of claim 12, wherein:
said weights wB, wS and wL are predetermined and static.

14. The method of generating a thumbnail image of claim 12, wherein:
said weights wB, wS and wL are adjustable according to a cluster of parameters.

15. The method of generating a thumbnail image of claim 14, further comprising the steps of:
forming the thumbnail by sub-sampling the input image to said predetermined thumbnail size if no region receives a final score exceeding a predetermined number.

* * * * *